US006397447B1

(12) United States Patent
Christopherson et al.

(10) Patent No.: US 6,397,447 B1
(45) Date of Patent: Jun. 4, 2002

(54) SHAFT SEAL PULLER TOOL

(76) Inventors: Scott Christopherson, 24801 Leto Cir., Mission Viejo, CA (US) 92691; Lewis H. Woo, P.O. Box 4094, Mission Viejo, CA (US) 92690-4094

( * ) Notice: Subject to any disclaimer, the term of this patent is extended or adjusted under 35 U.S.C. 154(b) by 0 days.

(21) Appl. No.: 09/668,812

(22) Filed: Sep. 23, 2000

Related U.S. Application Data

(60) Provisional application No. 60/157,418, filed on Oct. 2, 1999.

(51) Int. Cl.$^{7}$ .................................................. B23P 19/04

(52) U.S. Cl. ............................ 29/235; 29/267; 254/129

(58) Field of Search ................................ 254/129, 130, 254/131; 29/235, 267, 280, 278, 272, 253, 213.1, 426.5

(56) References Cited

U.S. PATENT DOCUMENTS

| | | | | | |
|---|---|---|---|---|---|
| 2,629,584 | A | * | 2/1953 | Cannon | 254/129 |
| 3,029,502 | A | * | 4/1962 | Middaugh | 254/129 |
| 3,577,848 | A | | 5/1971 | Mengle | |
| 3,744,758 | A | * | 7/1973 | Nakasone | 254/129 |
| 4,307,510 | A | * | 12/1981 | Sawyer et al. | 29/267 |
| 4,649,618 | A | | 3/1987 | Harrison | |
| 5,075,945 | A | * | 12/1991 | Krzecki | 29/235 |
| 5,778,720 | A | * | 7/1998 | Olexa | 29/267 |
| 5,909,074 | A | | 6/1999 | Herbert | |
| 5,974,646 | A | * | 11/1999 | Cotter | 29/267 |

* cited by examiner

*Primary Examiner*—Robert C. Watson

(57) ABSTRACT

A puller tool used with a pry bar, the pry bar includes a long portion to provide leverage in a curved area, the curved area for abutment with a surface to form a pivot and fulcrum, and a tip is provided on the other and shorter side of the pry bar curve for pushing against the puller tool. The puller tool is an elongate structure including a hook in a first area; a grippable surface in a second area, and a selectively positionable pry bar abutment member or pry base mounted to an intermediate area. The pry base can be manually repositioned relative to the hook. To use the combination to remove a seal about a shaft, the hook of the puller is slipped in-between the shaft and seal to engage the seal back side. The pry bar is located and the pry base is positioned against the pry bar tip with the curved pivot of the bar against a stationary surface. The pry bar is then moved in a direction to move the bar tip outward away from the seal, pushing against the pry base to push and move the entire puller tool and pull the seal from its seat.

8 Claims, 4 Drawing Sheets

SHAFT SEAL PULLER TOOL

A claim is hereby made for this application to the benefits of the earlier filing of our pending U.S. Provisional Application for patent, Serial No. 60/157,418 filed Oct. 2, 1999.

BACKGROUND OF THE INVENTION

1. Field of the Invention

The present invention is or includes a novel hand tool, as used in a kit and method including use of a pry bar hand tool for removing or pulling fluid seals located about shafts extending through passages in walls such as engine blocks and the like.

2. Brief Description of the Related Prior Art

In the prior art, fluid seals are applied around shafts to seal between the shaft and hole in which the shaft passes. The shaft seals commonly are circular (annular) and include a metal outer flange for tight-fit frictional engagement against the walls defining or surrounding the bore through the wall, with the metal flange supporting an inner circle of rubbery impervious or seal material engaging and sealing against the shaft. Such seals commonly but not always include circular tension springs engaged with the rubbery seal material to aid in forming an improved liquid tight seal against the shaft. Such seals periodically need to be removed to allow replacing of the shafts or the seal itself, or to allow the performance of other tasks. Such shaft seals are generally not easily or readily removed from the seal seat in the wall using conventional tools and methods, and this primarily due to the frictional fit of the metal portion of the seal being jammed tightly against the annular wall defining or surrounding the bore in the wall, engine block or transmission bell.

It is admitted that a variety of hand tool type pry bars of a type which can be used as part of or as a component of the present invention are prior art and well known. Virtually all automobile or vehicle mechanics have a suitable general purpose "J" shaped pry bar available for use in their tool box.

U.S. Pat. No. 5,904,074 issued May 18, 1999 to R. Herbert describes a tool for pulling packing material from about a shaft. The Herbert tool is directed at pulling "packing" and thus uses a helical or corkscrew element designed for screwing into and thereby grasping the packing material to be pulled. The Herbert device or arrangement uses a pry bar applied against fixed position lugs of a hand tool design by Herbert. One lug is pried against at a time. The Herbert "lugs" or "lug" are similar to what we call a "pry base" as will become appreciated with continued reading. We consider the Herbert lugs being fixed at predetermined intervals along the length of a shaft of the Herbert tool to be far less than desireable. Fixed position lugs do not provide sufficient versatility in the position of the ready to use pry bar. Herbert applies multiple fixed position lugs along the length of his tool shaft in an attempt to provide a usable degree of lug positionings, wherein the user selects the nearest suitably positioned lug to pry against, which, in our opinion, in many instances simply will not be optimally positioned. The position of the lug pried against clearly effects the position the tip and lever portions of the pry bar. The position of the pry bar tip has a direct effect on the position of the long lever portion of the pry bar. Many times, such as in the cramped confines of a bell type housing, engine compartment or the like, there is simply little room to maneuver the pry bar in order to properly apply pressure to the fixed position "lug" of the Herbert pulling tool.

The engines, transmissions and engine compartment and the like in modern vehicles continue to be made smaller with the passage of time, and therefore it is becoming increasingly important to provide greater versatility and precision in tools such as a shaft seal puller used to work on such components. Thus, we believe there is a need for further improvement in shaft seal puller tools and methods.

U.S. Pat. No. 3,577,848 issued May 11, 1971 to R. Mengle, and U.S. Pat. No. 4,649,618 issued Mar. 17, 1987 to S. Harrison are cumulative to the Herbert disclosure.

SUMMARY OF THE INVENTION

The present invention is or includes a novel hand operated puller tool which may be considered to be used in a kit and or method including use of a separate pry bar hand tool for removing or pulling fluid seals located about shafts extending through passages in walls such as engine blocks and the like.

Our invention is directed primarily toward but not limited to use with seals of engines and associated parts of autos, trucks, SUVs and the like, which as is well known, include drive shafts, crank and cam shafts and the like passing into or through holes or bores in blocks, bell and transmission housings and the like. With the present invention, seal pulling force gained through the use of leverage is very controlled and of a high level due to the use of directionally proper leverage, and thus the process of removing even a very firmly secured seal in a confined area is readily and safely accomplished.

Our invention uses a pry bar, preferably one which is generally "J" shaped, in combination with a specifically designed hand tool or puller tool to remove fluid seals secured in bores or passages through walls, wherein the seals encircle shafts to form a fluid seal about the shaft passing through the wall. Because our invention uses a puller tool and a separate pry bar, the invention can be considered, at least from one viewpoint, to be a seal pulling kit comprised of a pry bar and specifically designed puller tool. Our tool is more directed for use with seals of the type which are commonly circular (annular) and include a metal outer flange for tight-fit frictional engagement against the block walls defining or surrounding the bore through the wall, with the metal flange retaining an inner circle of rubbery seal material engaging and sealing against the shaft. The rubbery seal material may in many cases be biased inward tighter against the shaft with a circular tension spring. The metal flange and rubbery seal material of such shaft seals are installed and removed as a unit. A preferred embodiment of the present puller tool includes change-out or removable blade inserts having differently shaped/sized tips so that different styles, types and or sizes of seals or even packing material can be pulled.

The pry bar used includes a grippable area on a long or longer portion serving to provide leverage in a connected curved area, the curved area for abutment with a surface to form a pivot and fulcrum, and a tip for pushing is provided connected to the other side of the curve portion/fulcrum of the pry bar. The term connected does not necessarily mean two pieces attached, as most pry bars are single piece construction or integrally formed. The preferred pry bar is generally "J" shaped, but does not usually have a transverse member at the end of the long lever portion like the letter "J".

Our puller tool in preferred embodiment is an elongate shaft structure including a hook in a first area; a grippable surface in a second area, and a selectively positionable pry base mounted in an intermediate area between the first and second areas on the shaft, with the term intermediate not herein required to mean centered or perfectly centered. The pry base is a "pry bar abutment member" or shoulder preferably providing material 360 degrees around the supporting shaft, and so in a preferred version the pry base is a disk of rigid material. The grippable surface or graspable surface depending upon the particular embodiment of the puller tool, may be either a handle for grasping by the human hand, or may be threaded shafting or the like to be grasp or held with an auxiliary tool member which includes a handle or graspable surface, the grasping in either case being for grasping by hand or with a grasping tool and positionally manipulating the puller tool. The pry base can be manually repositioned relative to the hook (toward or away) along a lengthwise axis and is stationary against unwanted moving along the tool lengthwise axis once positioned or when pried against due to low slope threads in one preferred embodiment. A 90 degree and an offset puller tool are also herein disclosed. To use the combination to remove a seal about a shaft, the hook of the puller tool is manually guided and slipped in-between the shaft and seal, the hook is then pull forward and engages the back side of the seal, and preferably against the metal flange if possible, with this being a single handed operation. Using the other hand, the mechanic positions the pry bar in as near of a start position as possible. The pry base of the puller tool is positioned or is moved to be positioned a proper distance from the tip and fulcrum of the curve of the pry bar with the fulcrum abutting against a stationary surface such as an engine block or transmission bell, the pry bar tip placed against the pry base face which is facing the seal, and the lever portion of the pry bar nearer or even a little to the side and beyond the center line of the engine shaft so that the pry bar can be pivoted outward away from the shaft to in effect raise the pry tip away from the seal to be pulled. The preferred repositionable pry base and puller tool as a whole is one which allows the mechanic to hold the puller tool in place with the hook engaging the seal using the first three or four fingers and palm of the hand stabilizing the tool and shaft while using the thumb and maybe the index finger to reposition the pry base relative to the pry tip of the properly positioned pry bar. The preferred one-handed repositioning of the pry base allows the mechanic to hold the pry bar with pry tip in place and with the other hand to hold the puller tool with hook engaged behind the seal and then to make a fine position adjustment to the pry base, which more times than not will be to move the pry base onto or snugly against the tip of the properly positioned pry bar, which is a direction of toward the seal to be pulled. The pry bar is then manually moved in a direction to move the pry bar tip outward away from the seal or somewhat along the center lengthwise axis of the shaft about which the seal is placed, to push the pry base and thus hook away from the seal seat and pull the seal with the hook. The present seal puller tool includes the pry base against which the tip of the pry bar is applied being adjustable along the length of the puller tool shaft or toward and away from the hook, infinite adjustability is provided in a preferred embodiment. "infinite" is herein used to mean smooth or without steps or increments, and of course the pry base can only be moved within a movement range or range of travel, the range in the threaded version limited by the threads and terminations thereof. The position of the pry bar tip has a direct effect on the position of the long lever portion of the pry bar. We believe it is very important to be able to adjust, and in very small increments and preferably infinitely, the position of the pry base against which the pry bar tip is applied. Many times, such as in the cramped confines of a bell housing or the like, there is little room to maneuver the pry bar in order to properly apply pressure to the seal pulling tool, and through the infinite or small incremental adjustment of the pry base of our pulling tool, one can maximize the use of the limited space by being able to select the best position of the pry bar with the tip thereof firmly against the pry base. Typically, the lever portion of the pry bar will be nearer the shaft or center line at the beginning of pulling the seal, and then move outward or away from the shaft in the process of pulling the seal. The seal may not always be fully removed before the outwardly swinging lever portion of the pry bar engages an obstacle restricting further outward movement, with this being a situation wherein the lever (pry bar) is then moved (pivoted) back toward the shaft to provide space between the pry base and the tip of the pry bar, then the human operator moves the pry base toward the seal and against the tip of the pry bar, then the pry bar is again manually levered outward pulling the seal further if not fully from its seat. Usually a seal can be removed in just one or two of these levering operations, but more than two levering operations can be applied. The infinite or small incremental adjustability of the pry base along the length of the puller tool allows for precision and optimized operations, and in one preferred embodiment is accomplish via the pry base being threadably engaged with threads of a threaded shaft portion of our puller tool, wherein the human user can simply rotate the pry base with his/her thumb or thumb and fingers toward or away from the seal, the pry base traveling on the threads along the length of the threaded shaft, the direction of travel determined by the direction of rotation applied by the user, wherein clockwise rotation moves the pry base in one direction and counterclockwise rotation of the pry base moves it in an opposite direction along the lengthwise axis of the shaft to which the base is threadably mounted. Again, this adjustability of the position of the pry base in a preferred embodiment can be achieved by the finger(s) (thumb is herein considered a finger) of the hand holding the puller tool in place ready to be pried against, this allows the other hand to hold the pry bar in the best position for starting a seal removal operation. The threads engaged between the puller tool shaft and the pry base are sloped to provide the travel when manually rotated, but are sufficiently near horizontal or low sloped (not steep unless a lock is applied) not to allow the pry base to rotate and thus give unwanted travel when pried against with the pry bar in a seal pulling operation, and while some rotation and travel of the pry base may occur while pried against, it is not a significant amount and in fact allows for better angular adjustments between the pry base and pry bar tip as the relative angles thereof change with the pivoting pry bar.

Our puller tool can have differently shaped seal engaging ends other than the "hook" which we believe will be used most of the time. The hook can be of differing sizes and shapes too. Also, other arrangement not using the described threads, such as a pry base with affixed collar and set-screw (thumb set-screw) securable to the tool shaft, or a slidable collar affixed to the pry base with an over-center lever-handled cam lock for example, can also be used to achieve the basic end results and therefore the threaded engagement of the pry base to the shaft of the puller tool is preferred but for example. Exposed threads can be damaged in some circumstances and so infinitely or fine incremental adjustable pry base allowing structural arrangements not having exposed threads may be more preferred in some use situations.

In a preferred embodiment, the spacing between the handle (grippable or graspable area of the puller tool) and seal engagement hook is adjustable, with this basically allowing the lengthening or shortening of the overall or entire puller tool by the mechanic, again rendering the puller tool versatile for good functionality under various working conditions and spaces.

A greater appreciation of our invention may be gained with continued reading and with a study of our drawings.

BEST MODES FOR CARRYING OUT THE INVENTION

Figure 1:
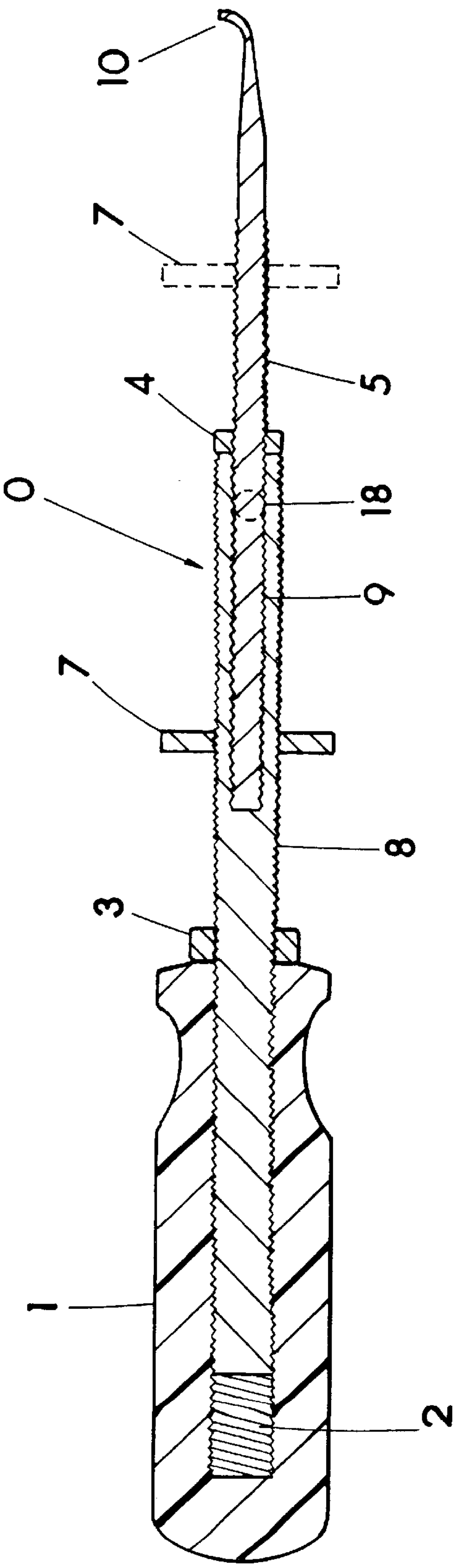
FIG. 1 is a side view, in cross section, of a preferred embodiment of seal puller tool in accordance with the present invention and including replaceable tool blade inserts.

With the details of the Summary of the Invention and the drawings in mind, a further description will now ensue with reference to the drawings. Firstly, part nomenclature and a brief description of the parts shown in the herewith included drawing figures will be provided, followed by further details. The part nomenclature and a brief description thereof is:

0 puller tool in general;
1 handle, can be made of plastics, metal, composites;
2 bore with surrounding threads in handle (FIG. 1);
3 lock nut, preferably metal with hexagonal exterior;
4 lock nut, preferably metal with hexagonal exterior;
5 threaded blade insert, preferably metal for strength and rigidity, supports hook 10 directly or indirectly;
7 positionable pry base, a rigid disk with threaded bore;
8 shaft with exterior threads;
9 bore with surrounding threads inside shaft 8 (FIG. 1);
10 hook, can be any suitable size and/or other shaped member;
11 eye member, eyelet with center bore and threads;
12 threads surrounding bore in eye member 11;
13 seal metal, outer portion of common shaft seal;
14 seal rubber, inner portion of common shaft seal;
15 shaft of engine, could be crank shaft for example only;
16 wall (block or bell through which shaft 15 passes);
17 pry bar, auxiliary tool, can be prior art tool;
18 through cross-hole with threads for accepting a blade insert threaded end rendering the puller tool in 90 degree configuration.

The present puller tool 0 is used in conjunction with the separate pry bar 17, and while our puller tool 0 itself may be viewed as an invention separate from its method of use and separate from the pry bar, the invention can also be viewed as a novel puller tool 0 of particular structure and used in conjunction with a pry bar and further in a particular methodology for removing a shaft seal.

Figure 3:
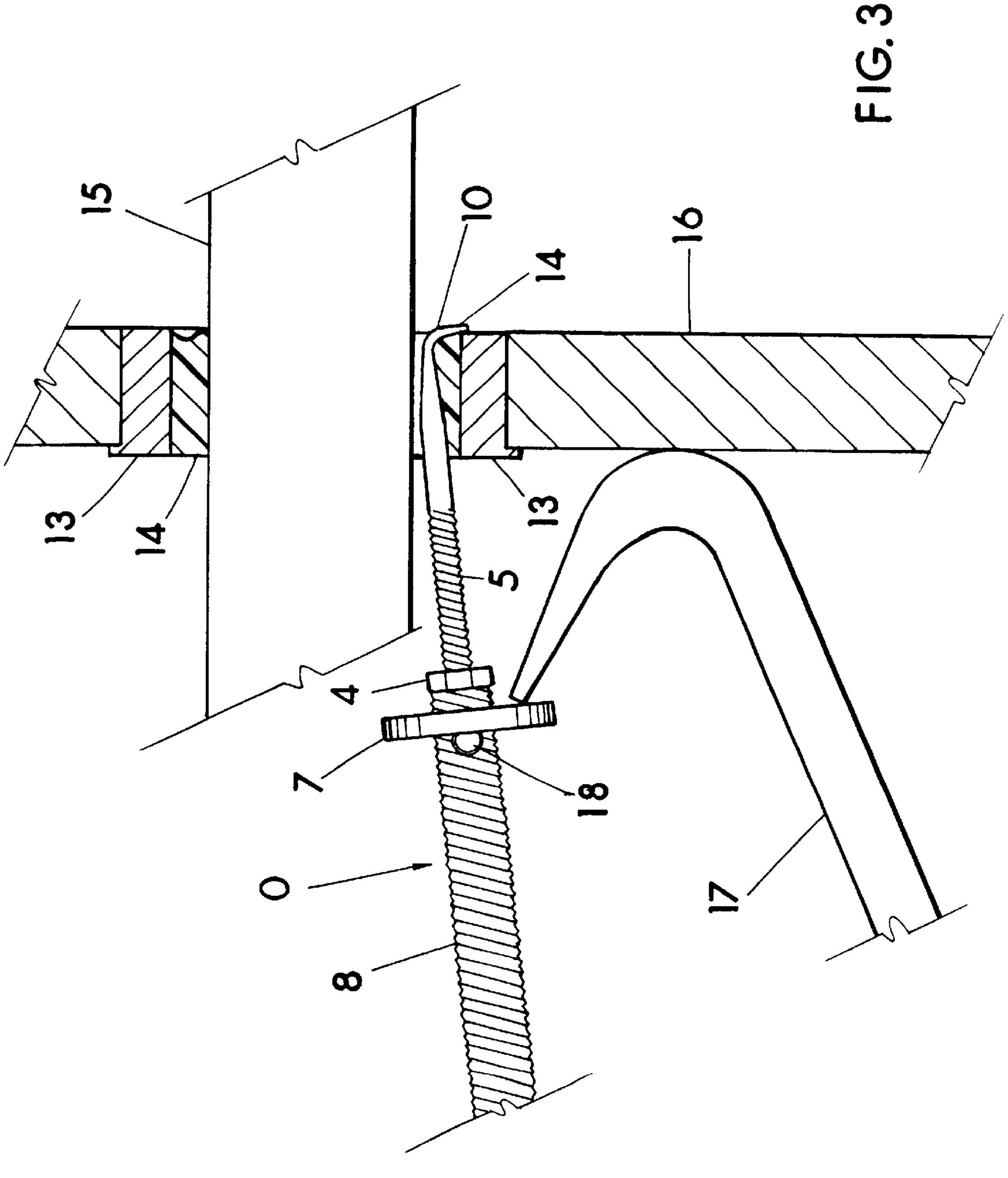
FIG. 3 is an in use illustration of the tool of FIG. 1 and a pry bar pulling a shaft seal from the seal seat in a wall. The puller tool and pry bar are only partially shown to allow a large scale of that shown, and a shaft is shown passing through the center of the seal.

The present invention allows a large amount of controlled pulling force to be applied to the shaft seal, thereby making the seal removing process easier, faster and safer. The pry bar 17 can be of any suitable type including many prior art types which include a hand graspable or handle region, a terminal end or point, and a curve portion or fulcrum. The pry bar should be small and lightweight enough to be used by one hand, leaving free the other hand to operate our novel puller tool 0. The curved portion or fulcrum of the pry bar 17 is preferably curved (see FIG. 3) and positioned between the handle region (long lever portion) and the point or terminal end of the pry bar, so that the fulcrum portion can be in effect rolled against a surface (wall) to move the terminal end away from the surface with the handle moving or being manually pushed in effect toward the surface. Our puller tool 0 is a seal puller actuated by leveraged force from the pry bar 17 against the pry base 7, and therefore can herein be referred to as a "pry actuated puller" or PAP for short.

Our pry actuated puller "PAP" can take numerous structural forms within the scope of the invention and including forms simpler than the embodiment shown in the included drawings, that shown in the drawings including various useful but optional features, optional at least from one viewpoint. In a simple stripped down version or description of our puller tool 0 "PAP", the tool comprises an elongate member having a graspable or grippable surface region "handle 1" to allow a user to hold and control the tool with one hand; a rigid length 8 or 5 of the tool extending from the handle 1 to a blade insert or hooked end 10 for hooking behind a seal; and a plate or disk-like pry base 7 positioned between the tool hooked end 10 and handle 1, the disk-like pry base 7 extending outward laterally relative to the lengthwise axis of the tool to provide surface area or material readily engageable with the point or terminal end of the pry bar 17. Pry base 7 preferably provides material 360 degrees radially about shaft 8 or 5 for allowing flexibility (choice) in contacting the pry bar 17 thereagainst regardless of the directional extension of hook 10. When using, the hooked end 10 is slipped between the shaft 15 and adjacent surrounding seal to "hook" behind and against the seal to be pulled, the PAP handle is held in one hand to properly guide and stabilize the puller tool 0, and then a pry bar 17 held in the other hand is positioned with the terminal end thereof positioned against the PAP pry base 7 with the pry bar curved portion or fulcrum located against the wall 16 through which the shaft 15 passes, or any other suitable structure, so that by prying with the pry bar 17, the disk-like pry base 7 which is stationary to the puller tool 0 as a whole is forced away from the wall (engine block or bell housing, etc.) and because of the hooked end 10 engaged with the "backside" of the seal, the seal is pulled from location as the "PAP" is pried away. The PAP and method of its use allows for high force achieved via the leverage gain from the pry bar, and the force is very controllable in amount, and to an extent, in direction. Depending upon the seal construction, the hook 10 can engage the rubbery 14 portion or the annular tension spring commonly associated therewith, or can be used to reach laterally outward beyond the rubbery 14 portion to engage the metal portion 13 of the seal so that the pulling force is applied to the metal portion 13 of the seal.

Figure 4:
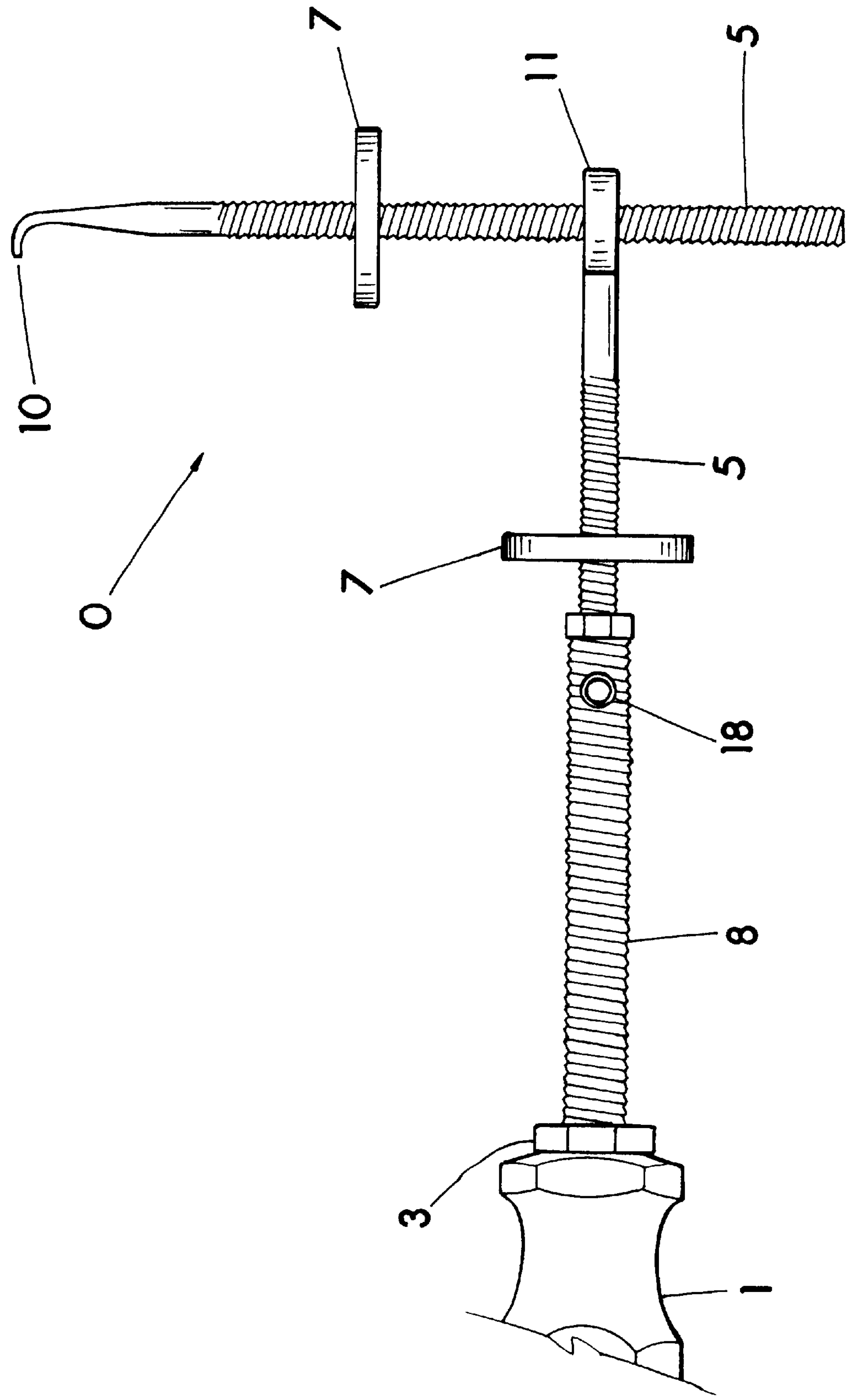
FIG. 4 shows the FIG. 1 tool but with the blade insert of FIG. 2 mounted to the puller tool shaft and grasping via engaged threads, the second end of the hook bearing blade insert shown at a 90 degree extension from the main shaft and handle of the puller tool. This is a highly versatile arrangement in accordance with the present invention which in some circumstances allows seal pulling in very close confines.

One common situation which occurs in the above described use of the simplified tool is that the disk-like pry base 7 is not the ideal distance from the wall (against which the pry bar fulcrum is to be butted) for the best locating of the pry bar fulcrum to position the balance of the pry bar at an ideal position and angle, thus we mount the pry base 7 to the extending portion shaft 8 or 5 or the like of our "PAP" via readily adjustable means using threads or other suitable arrangement as above described. The readily adjustable means is preferably threads or a threaded engagement allowing adjustment to the position of the pry base 7 relative to the hooked end 10 of the "PAP". The base 7 adjustability is preferably non-incremental, and threads provide such non-incremented adjustability. Small incremental adjustability of the pry base 7 long the lengthwise axis of the shaft of the puller tool would be acceptable in some cases, particularly where exposed threads were determined to be unsuitable due to rough service and the risk of damaging exposed threads. Small increment movement might be considered in a range of about a 1⁄16 to 1⁄4 inch. In FIG. 1, pry base 7 is threadably engaged to shaft 8 and or shaft 5 and can be selectively manually moved along the lengthwise axis of the tool, or in other words, towards and away from the distal end (hook end 10). Small incremented adjustability of the position of pry base 7 along the tool lengthwise axis as above described, at least at this writing, does not appear outside the scope of the invention. Another feature of our PAP is the providing of changeable tips or hooked end 10 so as to provide the user the ability to select differently sized and shaped tips for hooking or otherwise grasping or engaging a seal to be pulled. Seals vary in size, shape and mount locations, and our preferred embodiment of PAP (pry actuated puller) is further configured, in addition to the change-out tips 5, and position adjustability of the pry base 7, to include the ability to be configured into a 90 degree shaped PAP as indicated in FIG. 4, thus our PAP is highly versatile and useful for pulling a variety of seals in a variety of situations.

Figure 2:
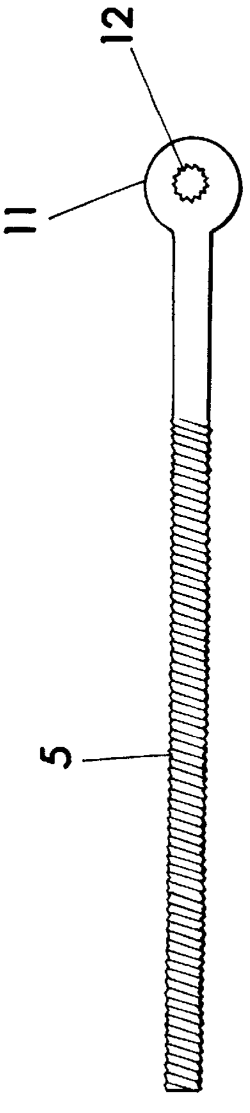
FIG. 2 is a side view of a blade insert usable with the FIG. 1 tool, and for holding a blade insert with a seal engagement member (hook).

A pry actuated puller "PAP" having some optional features is shown in a side view in cross section in drawing FIG. 1 and including handle 1 which can be the same or similar to a typical screw driver handle. Inside handle 1 and opening at one end of the handle 1 is a bore 2 having threads on the handle wall so as to engage the external threads of rigid shaft 8. Threaded nut 3, which is a jam nut, can be used to secure (lock) shaft 8 stationary to handle 1 with the threads engaged, the lock nut 3 jammed against the handle 1 end. The threaded engagement of shaft 8 to handle 1 allows shaft 8 to be adjustably positioned relative to handle 1 in its extension outward which can provide additional overall tool length and thus reach, but such length adjustability between shaft 8 and handle 1 is optional in that the shaft 8 can simply to rigidly affixed to handle 1 much like a common screw driver. In the example of FIG. 1, threads on the exterior of shaft 8 forward of handle 1 engage the hole surrounded by threads of disk-like pry base 7. Shaft 8 and pry base 7 are rigid and strong, as are most or all components of our pry actuated puller, although shaft 8 could in some arrangements be flexible to a degree. Pry base 7 is a rigid and strong disk or washer like structure, at least in the shown example, against which the tip of a pry bar 17 is located so as to receive force thereagainst in a direction toward handle 1 or away from the shaft seal to be pulled, as above described. A pry base 7 is shown in broken lines engaged by threads to threaded blade insert 5, the pry base 7 having a central hole with threads sized for the particular shaft 8 or 5 to which it is adjustably engaged. Shafts 8 and 5 are shown in the drawings as two different diameters, and thus the diameter of the central hole with surrounding threads of base 7 must of course be commensurate with the particular shaft to which it is to be engaged. The adjustability of pry base 7 is in its position relative to the blade insert 5 or hook 10 end, i.e., closer to or further from the hook 10 or seal engaging portion depending on need, again, as above described. Shaft 8 includes a threaded bore 9 aiming away from handle 1 for receiving the externally threaded end of insert 5, a jam nut 4 is shown as means for rendering insert 5 immobile relative to shaft 8, clearly insert 5 can be inserted more or less into bore 9 for adjusting lengths, and different inserts 5 having differing tips or hooks 10 or eye member 11 with a threaded bore 12 can be used as indicated in FIG. 2 and 4. As shown in FIG. 4, a blade insert 5 with the eye member 12 can threadably receive a threaded end of a blade insert 5 having a pulling end, i.e. hook 10, and while two pry bases 7 are shown for example of use flexibility, the base 7 threaded onto the insert 5 having the hook 10 will be the pry base against which the pry bar 17 is applied, at least in most cases.

Figure 5:
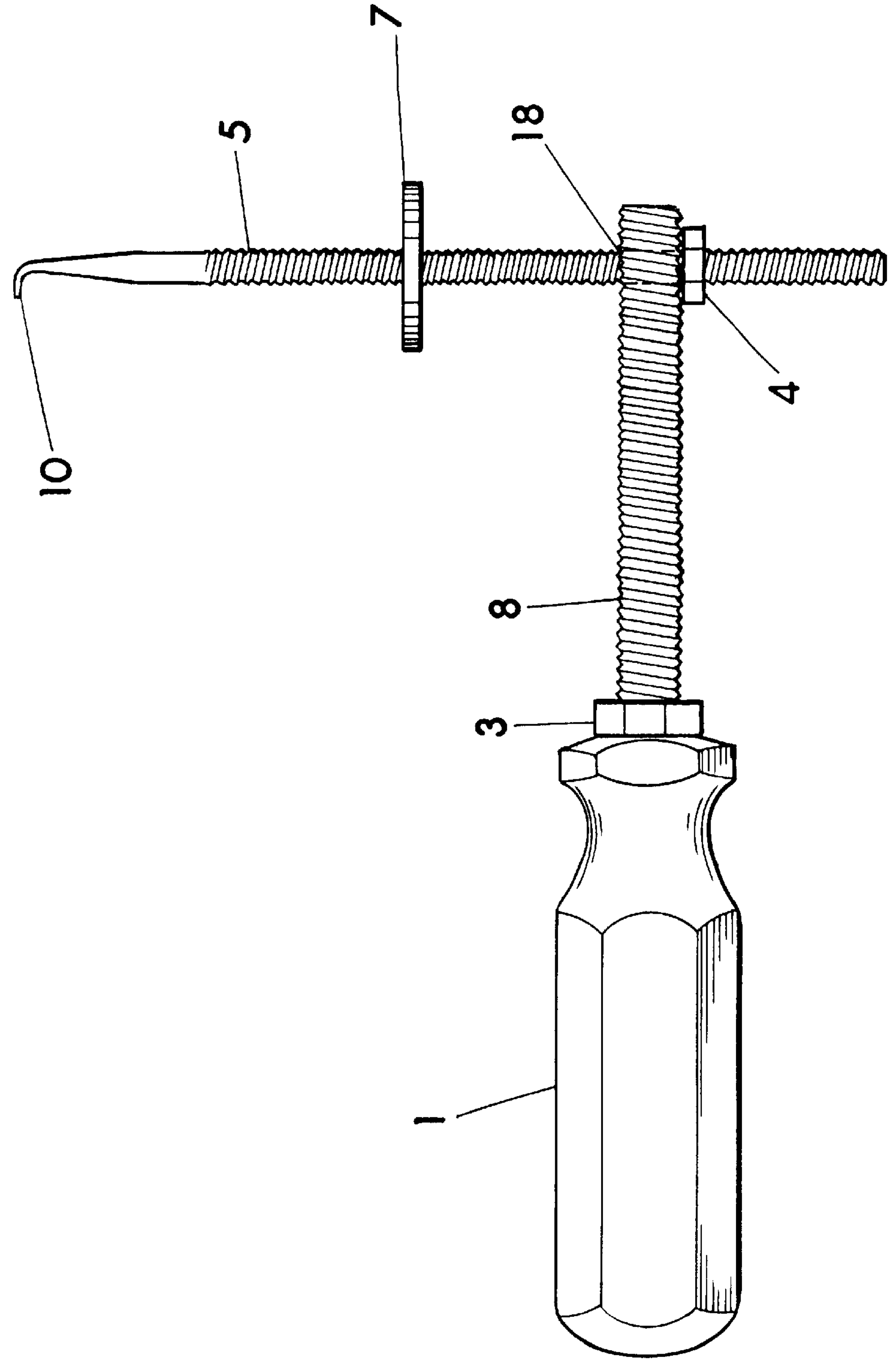
FIG. 5 shows the FIG. 1 tool but with the blade insert with hook shown and mounted at a 90 degree extension from the handled main shaft of the puller tool. This is a highly versatile arrangement in accordance with the present invention which in some circumstances allows seal pulling in very close confines.

FIG. 5 shows the FIG. 1 tool but with the blade insert 5 with hook 10 shown removed from that in FIG. 1 and reinstalled and mounted at a 90 degree extension from the main shaft 8 via the threaded end of blade insert 5 being threadably engaged through the transverse through-hole 18 in shaft 8. Through-hole 18 includes threads which are cooperative with the threads on the shaft of blade insert 5. A lock nut 4 is shown applied to the shaft to stabilize the blade insert 5 relative to the shaft 8. With the lock nut 4 loosened, the blade and thus hook 10 can be selectively rotated to position the hook as needed prior to tightening the lock nut if preventing further rotation is desired. This is a highly versatile arrangement in accordance with the present invention which in some circumstances allows seal pulling in very close confines. Through-hole 18 will also accept the threaded shaft end of the blade insert type having the eye member 11 with threads 12 of FIG. 2, which the eye 11 would accept a blade 5 with hook 10 resulting in an offset, and an adjustable offset arrangement which might be useful in some circumstances.

The above descriptions, as well as the included drawings, are to exemplify the invention and are not intended to limit the invention. Clearly those skilled in the art, upon a reading of this disclosure, will anticipate possible and reasonable variations falling within the true scope of our invention. Therefore, the true scope of our invention should be determined by the broadest possible and reasonable interpretation of our claims.

We claim:

1. A puller tool and pry bar combination for pulling a seal about a shaft, comprising;

- a pry bar, said pry bar comprising a long portion for serving as a grippable lever, a curved portion connected to the pry bar long portion, the curved portion for serving as a pivot when abutted against a surface, a tip portion connected to the curved portion opposite the pry bar long portion;
- a puller tool, said puller tool comprising:
  - an elongate rigid shaft structure having a first area, a second area, and intermediate area positioned between the first and second areas;
  - a seal hook mounted in said first area and exposed for hooking behind and engaging a seal;
  - a grippable surface in said second area for holding and positionally manipulating the puller tool; and
  - a pry base mounted to the elongate rigid shaft structure in the intermediate area for prying against with said pry bar, the pry base mounted by means for allowing selective positioning of the pry base relative to the seal hook.

2. A puller tool and pry bar combination according to claim 1 wherein said means for allowing selective positioning allows for infinite adjustment of the position of the pry base within a range.

3. A puller tool and pry bar combination according to claim 1 wherein said grippable surface is a handle.

4. A puller tool and pry bar combination according to claim 1 wherein said means for allowing selective positioning includes the pry base being a rigid disk having threads engaged with threads on the elongate rigid shaft structure, the pry base rotatable to travel on the threads of the shaft.

5. A puller tool and pry bar combination according to claim 4 wherein said grippable surface of said puller tool is a handle, said puller tool has a length between the handle and the seal hook, and said puller tool includes means for selectively adjusting the length between the handle and the seal hook.

6. A puller tool and pry bar combination according to claim 5 wherein said seal hook is removably mounted; and said means for selectively adjusting the length between the handle and the seal hook includes said elongate rigid shaft having threads within a bore for accepting a threaded shank portion supporting said seal hook.

7. A seal puller tool, comprising;

a shaft structure having a first area, a second area, and intermediate area;

a seal engagement member mounted in the first area and exposed for engaging a seal;

a graspable surface in the second area for grasping and positionally manipulating the puller tool; and a pry base mounted to the shaft structure in the intermediate area, said pry base mounted with means for allowing repositioning of the pry base relative to the seal engagement member, said means for allowing repositioning of the pry base includes the pry base having threads engaged with threads of the shaft structure and rotatable on the threads to travel along at least a portion of the shaft structure;

said puller tool further including means for selectively adjusting spacing between the graspable surface and the seal engagement member.

8. A seal puller tool, comprising;

a shaft structure having a first area, a second area, and intermediate area;

a seal engagement member mounted in the first area and exposed for engaging a seal;

a graspable surface in the second area for grasping and positionally manipulating the puller tool; and a pry base mounted to the shaft structure in the intermediate area, said pry base mounted with means for allowing user selectable repositioning of the pry base relative to the seal engagement member, said means for allowing repositioning of the pry base includes means for preventing unwanted travel of the pry base along the shaft structure when the pry base during seal pulling;

said puller tool further including means for selectively adjusting spacing between the graspable surface and the seal engagement member.

* * * * *